United States Patent
Remmel et al.

(10) Patent No.: US 6,902,218 B2
(45) Date of Patent: Jun. 7, 2005

(54) COVERING FOR UTILITY VEHICLE SUPERSTRUCTURES

(75) Inventors: Roger Remmel, Remscheid (DE); Rainer Freimann, Solingen (DE); Lars Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 10/657,917

(22) Filed: Sep. 9, 2003

(65) Prior Publication Data

US 2004/0178650 A1 Sep. 16, 2004

(30) Foreign Application Priority Data

Mar. 10, 2003 (DE) ...................................... 203 03 887 U

(51) Int. Cl.[7] .................................................. B60P 7/04
(52) U.S. Cl. ....................... 296/50; 296/100.16; 296/98
(58) Field of Search .......................... 296/24.4, 50, 98, 296/100.11, 100.16, 136.01, 106, 186.2, 147, 146.8; 135/119; 160/269, 349.1, DIG. 2, 8

(56) References Cited

U.S. PATENT DOCUMENTS

| | | | | |
|---|---|---|---|---|
| 181,047 | A | * 8/1876 | Cremer | 296/100.16 |
| 4,279,064 | A | * 7/1981 | Simme | 24/496 |
| 4,828,316 | A | * 5/1989 | Bennett et al. | 296/186.2 |
| 5,031,956 | A | * 7/1991 | Hudgins | 296/100.16 |
| 5,046,545 | A | * 9/1991 | Loomis et al. | 160/368.1 |
| 5,607,200 | A | * 3/1997 | Smidler | 296/186.2 |
| 5,658,037 | A | * 8/1997 | Evans et al. | 296/98 |
| 5,984,379 | A | * 11/1999 | Michel et al. | 296/100.16 |
| 6,478,361 | B1 | * 11/2002 | Wood | 296/98 |
| 6,513,852 | B1 | * 2/2003 | Krist et al. | 296/50 |

* cited by examiner

Primary Examiner—D. Glenn Dayoan
Assistant Examiner—Greg Blankenship
(74) Attorney, Agent, or Firm—Davidson, Davidson & Kappel, LLC

(57) ABSTRACT

The invention relates to covering for a utility vehicle superstructure that includes a tarpaulin made of cloth and having two lateral edges, the tarpaulin having elements which are prestressed in an opening direction. The lateral edges of the tarpaulin can each be secured laterally by a pivoting strip, respectively. The covering enables a superstructure opening of a utility vehicle superstructure to be closed when a lateral tarpaulin edge is jammed in the pivoting strip.

20 Claims, 7 Drawing Sheets

COVERING FOR UTILITY VEHICLE SUPERSTRUCTURES

Priority is claimed to German Utility Model Application DE 203 03 887.8, filed on Mar. 10, 2003, the entire disclosure of which is incorporated by reference herein.

BACKGROUND

The present invention relates to a covering for utility vehicle superstructures, and in particular coverings for lateral openings that can swing up when released. More particularly, the invention relates to utility vehicle superstructures having an opening to be covered with a tarpaulin.

Coverings for utility vehicle superstructures, in which a tarpaulin closes off a rear wall and is designed, in particular, as an extension of the tarpaulin cloth of the roof of the utility vehicle body, are known in practice. The tarpaulin is secured laterally by cords and, if appropriate, hooks and eyelets, and, after release of the lateral fastening, can be thrown onto the roof. It is disadvantageous in these known coverings that the closing of the tarpaulin along the lateral edges is complex and, moreover, the tarpaulin can, as a rule, only be thrown up with the aid of relatively long rods or the like, in order to completely free the opening of the vehicle body.

Coverings which automatically roll up and in which a series of spring bars in the tarpaulin are guided from the upper end of the tarpaulin to a tube provided approximately in the centre, are furthermore known in practice, the pretensioning of the springs permitting the tarpaulin to automatically coil up when the lateral connections of the tarpaulin are released, the tarpaulin, when coiled up, being brought together in the manner of a spiral. The tarpaulin can be moved down again, for example by a cord which is provided at a lower edge of the tarpaulin being pulled, the lateral and lower closure of the covering furthermore taking place via cords guided through eyelets or hooks. A disadvantage of a closed covering is that the spring forces in the tarpaulin are not eliminated, and so the covering is generally deformed outward in the region of the points at which the springs engage.

Coverings for utility vehicle superstructures, in which a tarpaulin is provided with a weather strip on the right-hand side and left-hand side, are furthermore known in practice, the tarpaulin having to be thrown by hand onto the roof of the utility vehicle body. To open up the tarpaulin, the lateral weather strips are clamped in each case in a pivoting strip, which can be pivoted in each case about a vertical axis, and the tarpaulin is closed by means of these as well. In this case, it is possible to secure the pivoting strip by an insertable lock or the like. A disadvantage of the known covering is that the throwing-up of the tarpaulin is complex and, moreover, the transported load is secured by the closed tarpaulin only to a limited extent. In addition, the locking pins are frequently lost.

In order to secure a load transported in the utility vehicle body, it is known in practice to diagonally fix tightening straps to the frame of the vehicle body and to the loading platform, the fixing of the tightening straps by hand being labor-intensive and having to take place in a separate working step before the covering is closed.

SUMMARY OF THE INVENTION

It is an object of the present invention to provide a covering which is easy to handle and allows to close an opening of a utility vehicle superstructure.

It is an alternate or further object of the present invention to provide a utility vehicle superstructure having an opening covered by a tarpaulin that is easily opened and closed.

It is an another alternate or additional object of the present invention to provide a utility vehicle superstructure of reduced weight where the covering for a rear opening is reliably held when the opening is closed.

It is a further alternate or additional object of the present invention to provide a covering for a utility vehicle superstructure which swings up automatically when released and is reliably closing an opening of the utility vehicle superstructure.

It is a still further alternate or additional object of the present invention to provide a covering for a utility vehicle superstructure that allows a single-handed operation.

A covering for a utility vehicle superstructure according to the invention comprises a tarpaulin made of cloth and having two lateral edges, the tarpaulin including elements, which are prestressed in an opening direction, wherein the two lateral edges of the tarpaulin can each be secured laterally by a pivoting strip.

A utility vehicle superstructure according to the invention, e.g. for a truck or for a container, comprises a superstructure opening, a pivoting strip arranged laterally of said superstructure opening, a tarpaulin for closing said superstructure opening, said tarpaulin comprising resilient members being prestressed in an upward direction, said tarpaulin further comprising at least one lateral tarpaulin edge, wherein said at least one lateral tarpaulin edge is configured to be jammed in said pivoting strip when said pivoting strip is pivoted in a holding position.

The covering according to the invention makes it possible, on the one hand, for the tarpaulin, when the covering is closed, to be rapidly and reliably secured laterally at uniform tension by a pivoting strip, and, when the pivoting strip is released, for opening to take place virtually automatically by the tarpaulin being rolled up on account of the prestressed elements being released without the tarpaulin having to be thrown up. The provision of cords for securing the lateral edges of the tarpaulin is rendered superfluous, and for the first time a covering is provided which automatically virtually completely opens up the corresponding opening when the pivoting strips are opened. All in all, in just a few movements the tarpaulin can be reliably and reproducibly closed both at its lateral edges and at its lower edge without being overstretched and without being deformed at the points where the prestressed elements engage.

The tarpaulin expediently has, at its lower edge, a lower strip which forms the end of said tarpaulin and to which there is expediently also attached a cable or the like which can be used to pull the rolled-up tarpaulin downward when the covering is to be closed. The lower strip advantageously makes it possible to introduce a force into the tarpaulin in order to roll out the elements, which are pretensioned in the opening direction, counter to their pretensioning and in order to bring the tarpaulin into its closed position. At the same time, the lower strip makes it possible to introduce the downwardly directed forces essentially uniformly over the entire width of the tarpaulin and prevents the tarpaulin from being partially rolled up due to the pretensioned elements.

The lower strip is expediently engaged over and secured by a rectangular profile of the pivoting strip, so that, in a first phase of the closing movement the pivoting strip, the lower strip is secured in terms of its height. This prevents unintentional relaxing of the tarpaulin, which is associated with a rolling-up process, before the pivoting strips have been completely pivoted into place. It has to be understood that instead of the rectangular profile a different profile that engages over the pivoting strip may also be provided.

It is advantageously possible to fit tightening straps or the like to the lower strip, said tightening straps serving less for the purpose of closing the opening by a covering than for securing the transported load, the forces which act on the straps being introduced via the lower strip and the pivoting strip into the frame of the utility vehicle body and therefore advantageously not causing a load on the tarpaulin. The straps may run diagonally or longitudinally and are expediently arranged on an upper canopy frame, in particular in an upper region of a portal of a utility vehicle body.

The pivoting strip advantageously has a guide handle which serves, on the one hand, for pivoting the pivotable part of the pivoting strip but, on the other hand, is designed to be axially displaceable and, together with an opening in the non-pivotable part of the pivoting device, defines a locking device. For this purpose, a lug which is connected to the handle is expediently pretensioned in the locking direction by a spring, it being possible for the handle, by being pulled back in the axial direction, to overcome the spring force and for the lug to be moved back out of the locking position into a release position. This advantageously ensures single-handed operation of the pivoting strip both when opening and also when closing it, by the lug sliding into a corresponding opening of the non-moveable part of the pivoting strip under recoiling of the handle and, during opening, by the handle first of all being pulled back and the moveable part of the pivoting strip being opened by a first amount, as a result of which the lateral edge of the tarpaulin, which edge is preferably designed as a weather strip, is unhitched and, on further opening of the pivoting strip, the lower strip is also released.

The moveable part of the pivoting strip preferably has a rectangular profile which, when the pivoting strip is closed, carries along the edge, in particular the weather strip of the tarpaulin, in a favorable manner and at the same time slides on the remaining region of the tarpaulin, so that the tarpaulin is not overstretched.

The covering is particularly advantageously suitable for the rear side of a truck and can be used instead of fixed rear wall doors, since it ensures both reliable closing of the covering and opening up of the corresponding opening when the pivoting strip is opened. This significantly reduces the movements required for loading and unloading utility vehicles, and a cost-effective and easily removable alternative to fixed superstructures is provided.

Further advantages and features of the invention will emerge from the following description.

BRIEF DESCRIPTION OF THE DRAWINGS

The invention will be explained in greater detail below with reference by means of to preferred embodiments with reference to the attached drawings, in which.

DETAILED DESCRIPTION OF PREFERRED EMBODIMENTS

Figure 1:
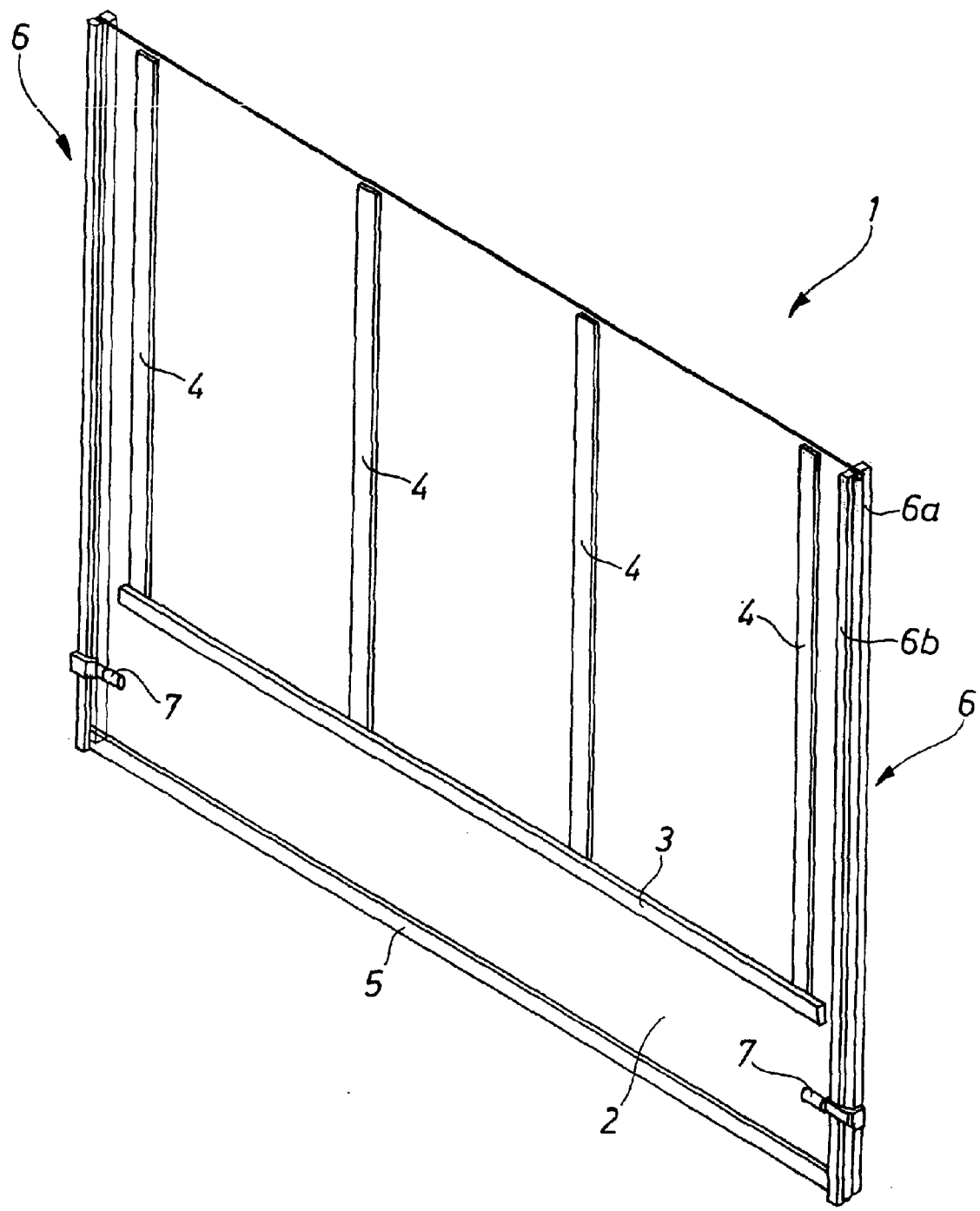
FIG. 1 shows a perspective view of a first preferred exemplary embodiment of a covering according to the invention.

FIG. 1 schematically shows a covering 1 for a utility vehicle body, in which a tarpaulin 2 made of cloth has arranged inside the tarpaulin 2 a horizontal bar 3, on which four pretensioned elements engage, said elements being designed as spring bars 4 and extending as far as the upper region of the tarpaulin 2. The spring bars 4 are designed in such a manner that they roll up when released.

A lower strip 5 which forms the end of the tarpaulin 2 over its entire width is provided in the lower region of the tarpaulin 2.

Pivoting strips 6 are provided on both longitudinal sides of the tarpaulin 2, said pivoting strips being illustrated in the closed position in FIG. 1 and fixing an edge region of the tarpaulin 2, which region is formed with a weather strip 17. Furthermore, the pivoting strips 6 engage over the lower strip 5 and therefore secure the covering 1 in its entirety in a closed position.

The pivoting strips 6 have a first rectangular profile 6a, which is connected fixedly to a canopy frame of the utility vehicle body, and a further rectangular profile 6b, which is arranged in an articulated manner by a pivoting on the first profile 6a and can be actuated via a handle 7.

Figure 2:
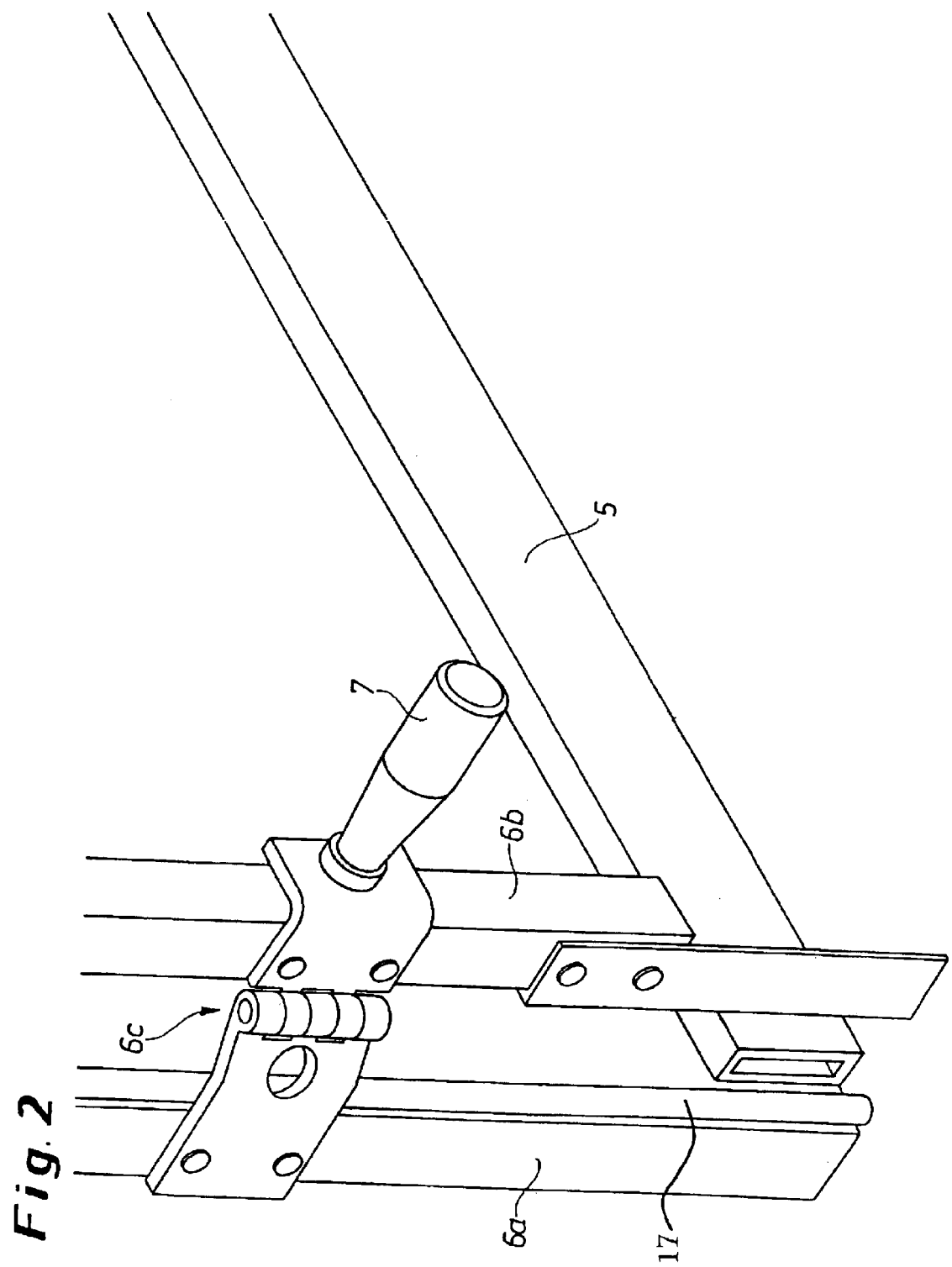
FIG. 2 shows a view of a detail of a pivoting strip of the covering from FIG. 1.

It can be seen in FIG. 2 that the rectangular profile 6b is shortened in such a manner that it ends above the lower strip 5 and therefore secures the strip 5 together with the tarpaulin 2 on its lower end side against the force that is directed upward on account of the pretensioning of the spring leaves 4. It should be taken into consideration here that the pivotable articulation of the second rectangular profile 6b on the first rectangular profile 6a takes place via a hinge 6c, in which the hinge leaf assigned to the fixed rectangular profile protrudes a good distance, thus enabling the second rectangular profile 6b to be pivoted inward. This advantageously ensures that the tarpaulin 2 can be carried along and tensioned by the second rectangular profile 6b, in particular if a weather strip 17 or another projecting border is provided.

Figure 3:
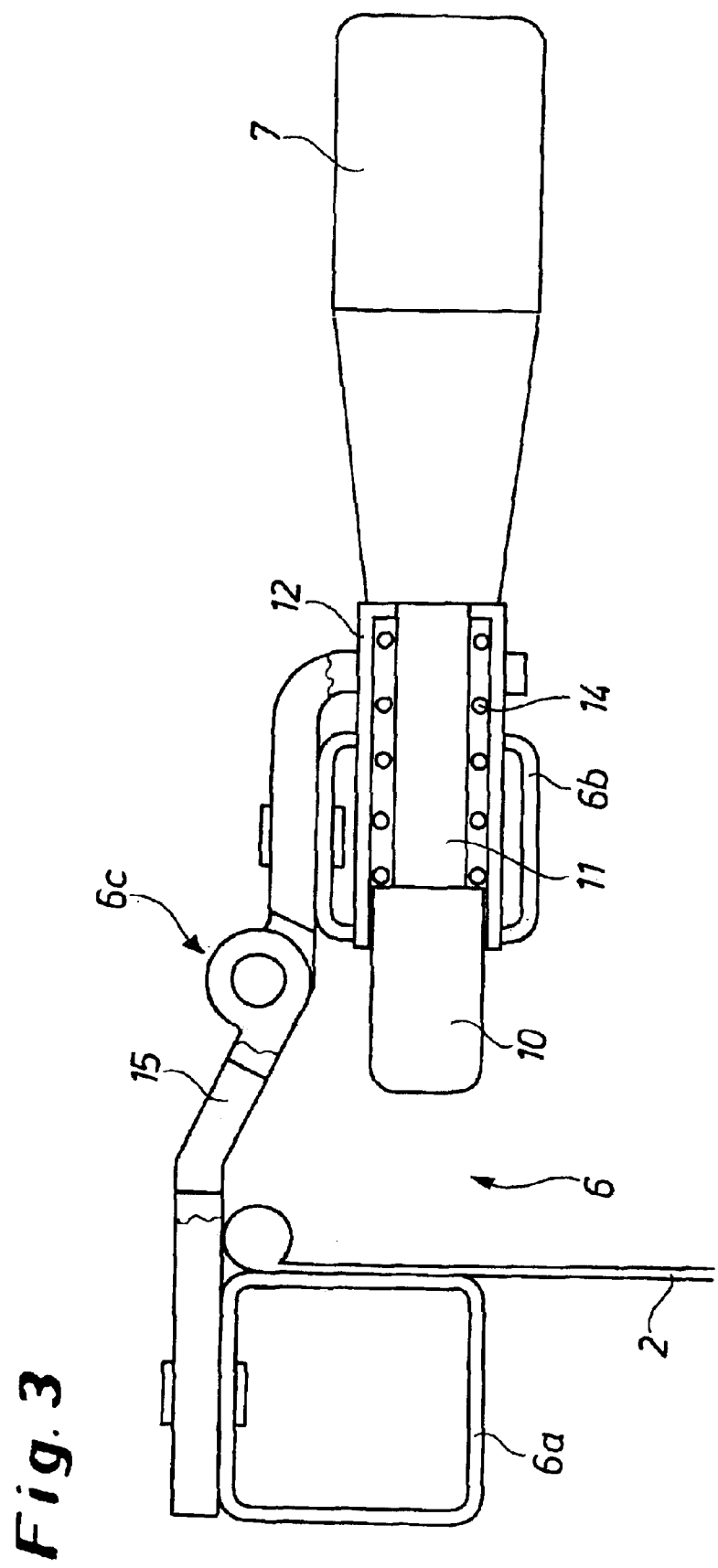
FIG. 3 shows a cross section through the pivoting strip from FIG. 2.
Figure 4:
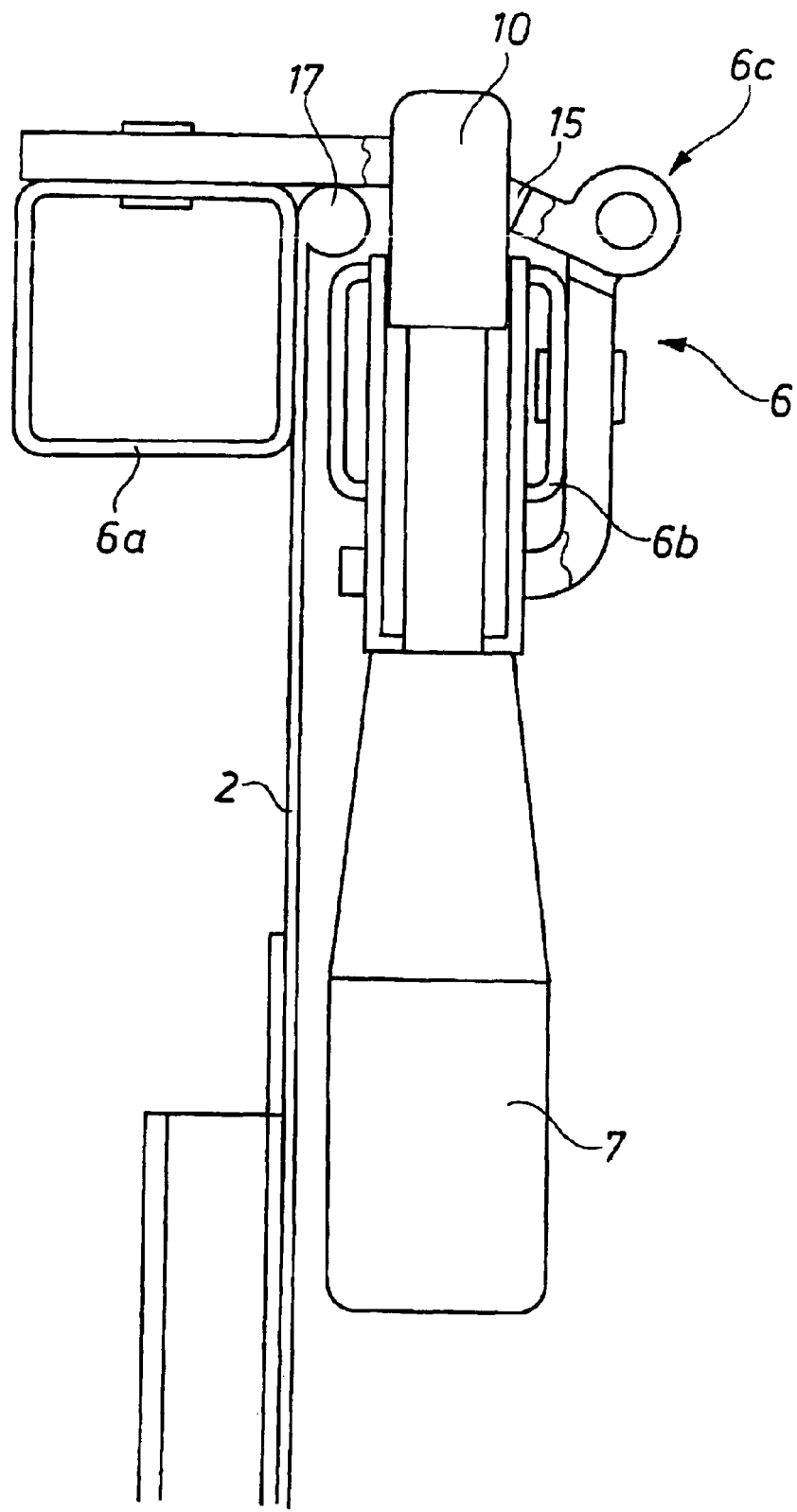
FIG. 4 shows the pivoting strip from FIG. 3 in the closed state.

The precise functioning can be seen schematically in FIG. 3. The handle 7 is connected via a bolt 11 to a lug 10, the rear side of the lug 10 being acted upon by a spring 14 (indicated schematically), which is arranged in a housing 12. If the handle 7, and therefore the second rectangular profile 6b, is pivoted in the direction of the closing position, the lug 10 first of all butts against a region of the leaf spring and pushes back the handle 7 until the lug 10 can snap into an opening 15 of the hinge and the tarpaulin 2 is therefore securely locked. As can be seen in particular in FIG. 4, the second rectangular profile 6b then pushes the weather strip 17 of the tarpaulin 2 into a tensioned position, which makes it impossible to unthread the tarpaulin 2. To release the tarpaulin 2 from the pivoting strip 6, the handle 7, and therefore the lug 10, is pulled back and the pivoting strip 6 pivoted open.

Figure 5:
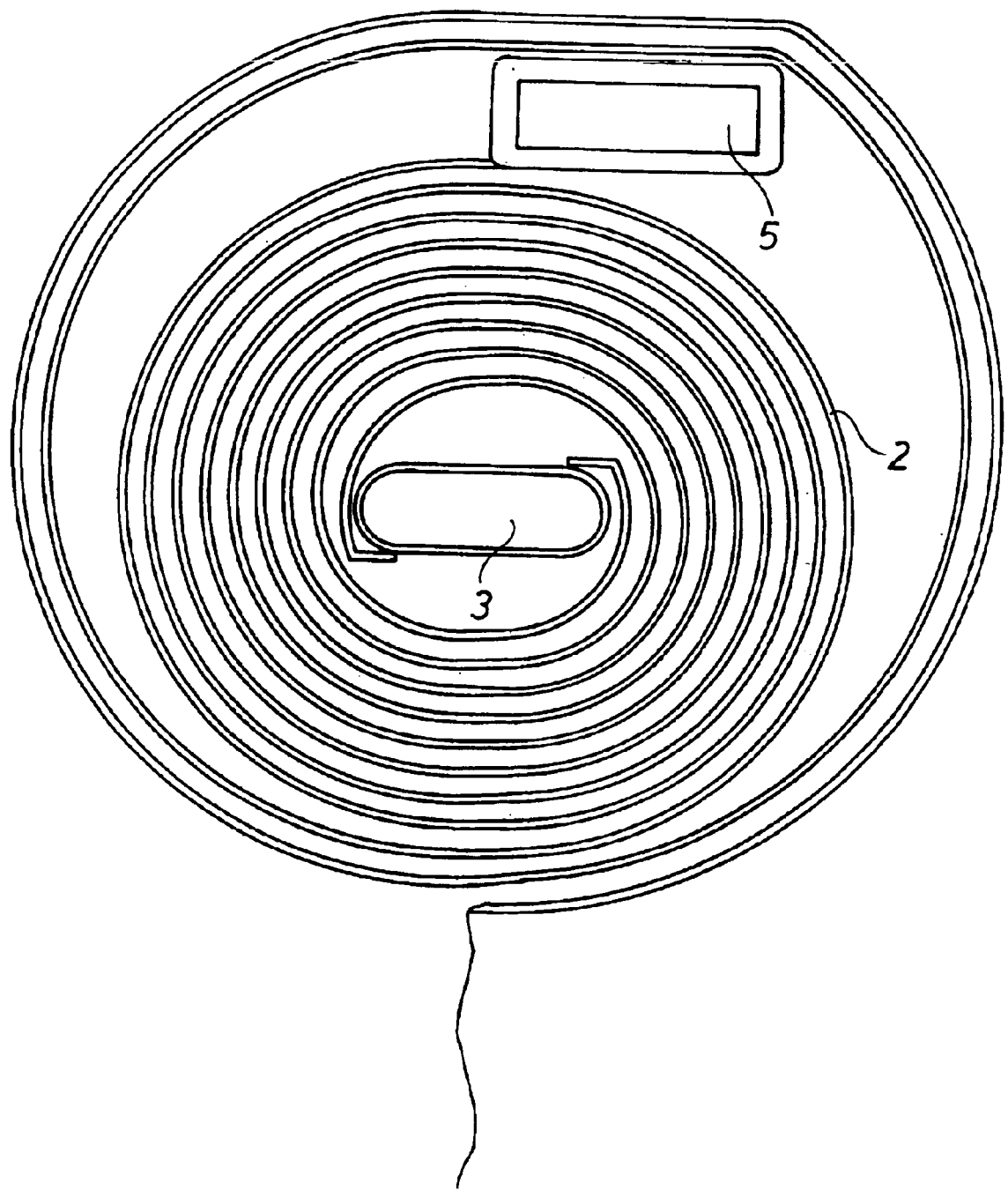
FIG. 5 shows a cross section through the tarpaulin of the covering from FIG. 1 in the rolled-up state.

FIG. 5 schematically shows the rolled-up covering 1, the latter having been thrown onto the roof, and it can be seen that, owing to the extent of the springs 4, covering more than half of the height, and the bar 3, which is therefore arranged below half of the extent of the tarpaulin 3, the lower strip 5 has been wound into the spiral-shaped package.

Figure 6:
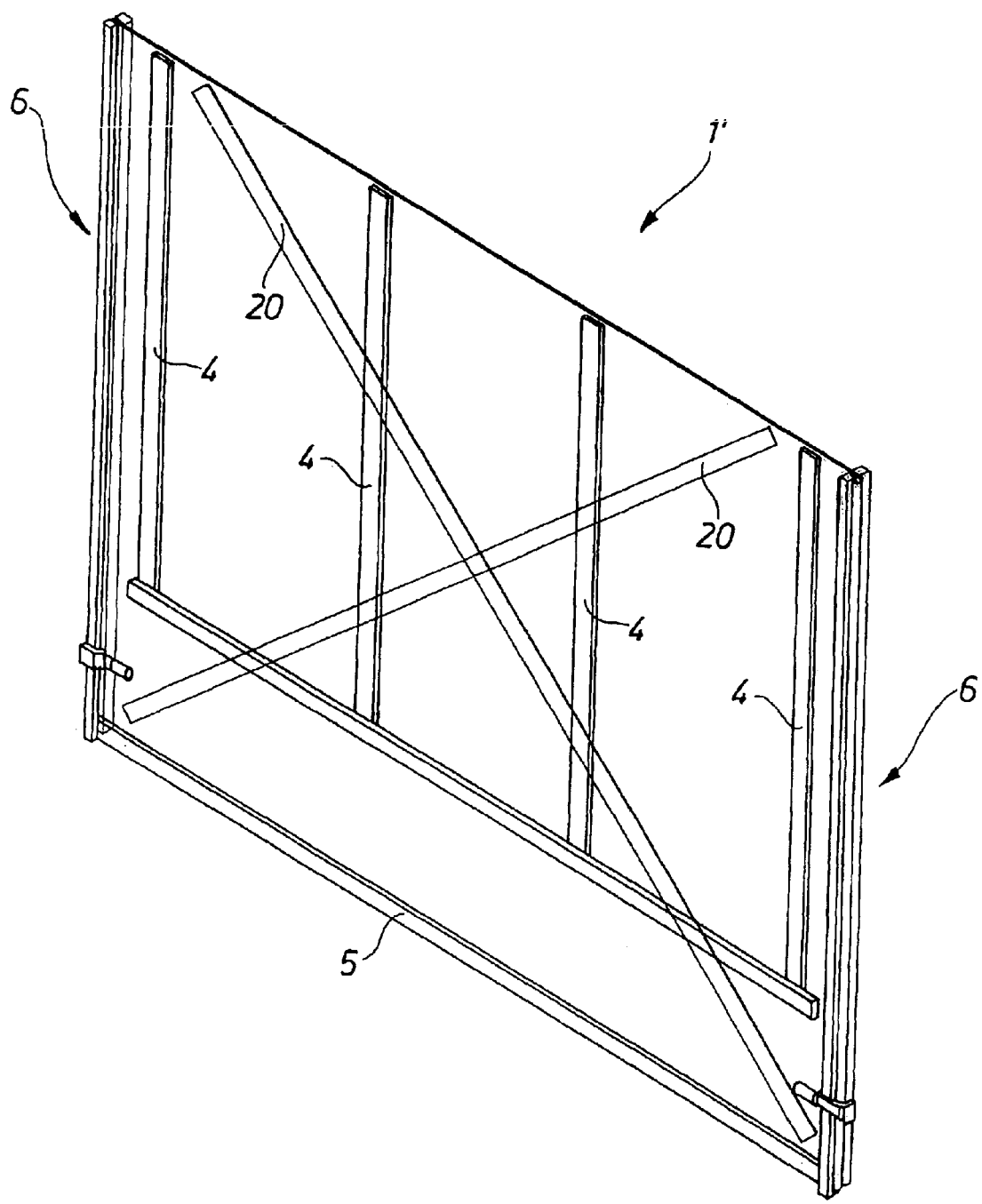
FIG. 6 shows a perspective view of a second preferred exemplary embodiment of a covering according to the invention.

FIG. 6 shows an alternative embodiment comparable to FIG. 1, in which diagonal tightening straps 20 are provided in addition to the parts illustrated in FIG. 1. In the lower corners, the diagonal tightening straps 20 engage in each case on means provided for this purpose on the lower strip 5 and can therefore be stretched out at the same time as the covering 1 is closed, and used for stiffening the tarpaulin 2.

Figure 7:
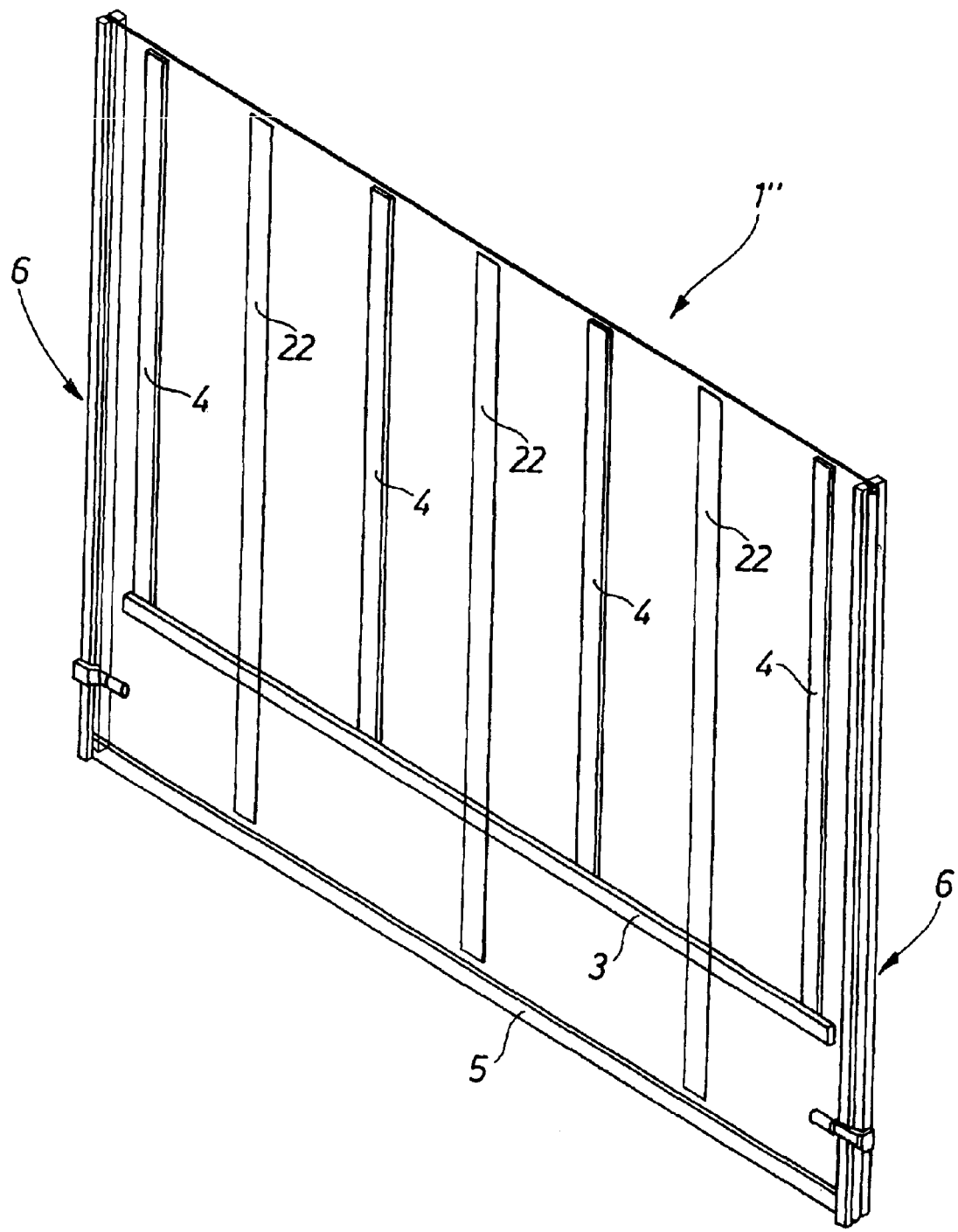
FIG. 7 shows a perspective view of a third preferred exemplary embodiment of a covering according to the invention.

FIG. 7 shows a further alternative embodiment of a covering presented as an embodiment followed by a double prime, in which, instead of diagonal straps 20, vertical straps 22 are provided, which are likewise fitted directly to the lower strip 5 and can be used for the same purpose.

It has to be understood that both diagonal and also vertical straps can be combined with one another, or that, moreover, also a plurality of straps originating from the upper corners of the covering can be connected at different angles to the lower strip 5.

What is claimed is:

1. A covering for a utility vehicle superstructure, comprising:
    a tarpaulin made of cloth and having two vertical lateral edges, said tarpaulin including a plurality of elements which are prestressed in an opening direction of the tarpaulin; and
    two pivoting strips, wherein each of the two vertical lateral edges of the tarpaulin can be secured laterally by one of the pivoting strips.

2. The covering as recited in claim 1, wherein the tarpaulin comprises a lower strip disposed at a lower edge of the tarpaulin defining an end of said tarpaulin.

3. The covering as recited in claim 2, wherein each of the pivoting strips includes a rectangular profile and the lower strip is engaged over and secured by the rectangular profile of each pivoting strip.

4. The covering as recited in claim 2, further comprising a plurality of tightening straps connected to the lower strip and arranged for stretching the tarpaulin diagonally or longitudinally.

5. The covering as recited in claim 4, wherein tarpaulin includes an interior side facing an interior of the superstructure and wherein the tightening straps are fitted on the interior side.

6. The covering as recited in claim 1, wherein each pivoting strip includes a guide handle.

7. The covering as recited in claim 1, wherein each pivoting strip includes a locking device locking the pivoting strip in a closed position.

8. The covering as recited in claim 7, wherein the locking device includes a rectangular profile, and the tarpaulin includes a weather strip, the weather strip being held by the locking device.

9. The covering as recited in claim 7, wherein the pivoting strip includes a guide handle and the locking device includes a spring configured to be tensioned by a pulling of the guide handle.

10. The covering as recited in claim 1, wherein the tarpaulin is configured to close a rear opening of the vehicle superstructure.

11. The covering as recited in claim 10, wherein the vehicle superstructure is disposed on a loading platform of a truck, and wherein the covering is an extension of a roof tarpaulin of said truck.

12. The covering as recited in claim 1, wherein each of the two pivoting strips have a length substantially same as a length of a respective one of the two vertical lateral edges.

13. The covering as recited in claim 1, wherein each of the two pivoting strips is configured to secure a respective one of the two vertical lateral edges along at least a portion of its extension.

14. A utility vehicle superstructure for a truck or a container, comprising;
    a superstructure opening;
    a pivoting strip disposed laterally of said superstructure opening and pivotable about a vertical axis to a holding position;
    a tarpaulin for closing said superstructure opening, said tarpaulin including a plurality of resilient members prestressed in an upward direction and a first lateral tarpaulin edge configured to be held by said pivoting strip when said pivoting strip is pivoted to the holding position.

15. The utility vehicle superstructure as recited in claim 14, further comprising a second lateral tarpaulin edge and a second pivoting strip disposed laterally of said superstructure for holding the second lateral tarpaulin edge.

16. The utility vehicle superstructure as recited in claim 14, wherein said plurality of resilient members include spring bars arranged vertically and disposed parallel to said first lateral tarpaulin edge.

17. The utility vehicle superstructure as recited in claim 14, further comprising a guide handle for operating the pivoting strip and a nose displaceable within the guide handle, wherein the guide handle includes a spring urging the nose toward a distal position, the nose being retractable by pulling the guide handle and stressing the spring.

18. The utility vehicle superstructure as recited in claim 14, wherein the first lateral tarpaulin edge includes a weather strip, and wherein said weather strip is held by said pivoting strip.

19. The utility vehicle superstructure as recited in claim 18, wherein said tarpaulin includes a lower strip having an extension, the extension being locked by said pivoting strip.

20. The utility vehicle superstructure as recited in claim 14, wherein the plurality of resilient members are configured to roll the tarpaulin upward along the pivoting strip.

* * * * *